United States Patent
Zhao et al.

(10) Patent No.: US 12,321,368 B2
(45) Date of Patent: Jun. 3, 2025

(54) METHOD, DEVICE, AND STORAGE MEDIUM FOR SCHEDULING A DISTRIBUTED DATABASE

(71) Applicant: Douyin Vision Co., Ltd., Beijing (CN)

(72) Inventors: Gang Zhao, Beijing (CN); Qiang Chen, Beijing (CN); Ziqi Gao, Beijing (CN); Kang Li, Beijing (CN)

(73) Assignee: DOUYIN VISION CO., LTD., Beijing (CN)

(*) Notice: Subject to any disclaimer, the term of this patent is extended or adjusted under 35 U.S.C. 154(b) by 0 days.

(21) Appl. No.: 18/744,410

(22) Filed: Jun. 14, 2024

(65) Prior Publication Data
US 2025/0036653 A1    Jan. 30, 2025

(30) Foreign Application Priority Data
Jul. 26, 2023 (CN) .......................... 202310928308.1

(51) Int. Cl.
*G06F 16/27* (2019.01)
*G06F 16/21* (2019.01)

(52) U.S. Cl.
CPC .......... *G06F 16/278* (2019.01); *G06F 16/214* (2019.01)

(58) Field of Classification Search
CPC .................................................... G06F 16/278
USPC ........................................................ 707/634
See application file for complete search history.

(56) References Cited

U.S. PATENT DOCUMENTS

| 9,438,665 | B1* | 9/2016 | Vasanth | .................. H04L 67/61 |
| 9,489,443 | B1* | 11/2016 | Muniswamy-Reddy | ..................... G06F 16/27 |
| 10,095,428 | B1* | 10/2018 | Meiri | ..................... G06F 3/0647 |
| 11,726,684 | B1* | 8/2023 | Sangle | ..................... G06F 3/061 711/171 |

(Continued)

FOREIGN PATENT DOCUMENTS

| CN | 103139302 A | 6/2013 |
| CN | 103729436 A | 4/2014 |

(Continued)

OTHER PUBLICATIONS

Li et al., "TADRP: Toward Thermal-aware Data Replica Placement in Data-intensive Data Centers," IEEE Transactions on Network and Service Management, IEEE, 2023, vol. 20, No. 4, 19 pages.
Partial European Search Report for European Patent Application No. 24182092.7, mailed on Dec. 18, 2024, 17 pages.

(Continued)

*Primary Examiner* — Muluemebet Gurmu
(74) *Attorney, Agent, or Firm* — Astute IP Law Group

(57) ABSTRACT

The embodiments provide a method, device, and storage medium for scheduling a distributed database. Load states of respective storage units in a first storage node in a distributed database are detected by any of a plurality of management devices of a distributed database, and a hotspot partition of the first storage unit is determined based on the load states; a replica splitting task for a target replica stored in the hotspot partition is generated, the replica splitting task comprising the target number of subreplicas of the target replica after splitting and migration target addresses of the subreplicas; the replica splitting task is executed by invoking a thread in a thread pool, to split the target replica into the subreplicas based on the target number of the subreplicas and migrate at least one of the subreplicas based on the migration target addresses of the subreplicas.

18 Claims, 3 Drawing Sheets

(56) References Cited

U.S. PATENT DOCUMENTS

| | | | | |
|---|---|---|---|---|
| 2015/0046395 | A1* | 2/2015 | Rath | G06F 16/27 |
| | | | | 707/623 |
| 2018/0096045 | A1* | 4/2018 | Merriman | G06F 16/273 |
| 2021/0208987 | A1* | 7/2021 | Hao | G06F 3/0647 |
| 2023/0367749 | A1* | 11/2023 | Xiong | G06F 16/214 |

FOREIGN PATENT DOCUMENTS

| | | |
|---|---|---|
| CN | 111949379 A | 11/2020 |
| CN | 112578997 A | 3/2021 |
| CN | 114827181 A | 7/2022 |
| EP | 2724268 B1 | 1/2019 |

OTHER PUBLICATIONS

Edwards, "The new stack: Meet CockraochDB, the resilient SQL databaase", Cockroach Labs, Available on internet at: https://www.cockroachlabs.com/blog/the-new-stack-meet-cockraochdb-the-resilient-sql-database/, Oct. 30, 2015, 12 pages.

Office Action for Chinese Patent Application No. 202310928308.1, mailed on Apr. 23, 2025, 15 pages.

SOFAJRaft, "Implementation Analysis of SOFAJRaft RheaKV Multi-Raft-Group | Implementation Principle of SOFAJRaft", SofaStack, Jul. 24, 2019, Available on internet at: https://www.sofastack.tech/blog/sofa-jraft-rheakv-multi-raft-group/, Jul. 24, 2019, 31 pages.

Tyler_Zx, "What is Multiraft", retrieved from: https://blog.csdn.net/qq_38289815/article/details/107682089, Jul. 30, 2020, 7 pages.

* cited by examiner

METHOD, DEVICE, AND STORAGE MEDIUM FOR SCHEDULING A DISTRIBUTED DATABASE

CROSS-REFERENCE TO RELATED APPLICATION

This application claims priority to Chinese patent application No. 202310928308.1, filed on Jul. 26, 2023 and entitled "METHOD, DEVICE, AND STORAGE MEDIUM FOR SCHEDULING A DISTRIBUTED DATABASE", which is incorporated herein by reference in its entirety.

FIELD

Embodiments of the present disclosure relate to the field of computer and network communications technologies, and in particular, to a method, device, and storage medium for scheduling a distributed database.

BACKGROUND

Compared with a traditional database, a distributed database introduces a consensus algorithm into a database technology, thereby implementing consistency of a plurality of replicas of data, and naturally guaranteeing high availability of a system. A plurality of replicas of data are stored in a distributed database, and there is a primary/secondary relationship among a plurality of replicas of the same piece of data, which can be respectively referred to as a primary replica and a secondary replica, in which the primary replica usually provides a read-write service, and the secondary replica provides a read-only service. Due to the existence of functional differences between the primary and secondary replicas, it is necessary to schedule the replicas evenly among a plurality of nodes in the system.

In conventional solutions, certain replicas in a distributed database may have certain read and write pressures, which causes a disk hotspot problem to occur, affects read and write performance, and even causes a disk to be damaged.

SUMMARY

Embodiments of the present disclosure provide a method, device, and storage medium for scheduling a distributed database, so as to reduce a disk hotspot problem.

In a first aspect, an embodiment of the present disclosure provides a method of scheduling a distributed database, comprising:
  detecting load states of respective storage units in any first storage node in a distributed database, and determining a hotspot partition of any first storage unit based on the load states;
  generating a replica splitting task for a target replica stored in the hotspot partition, the replica splitting task comprising the target number of subreplicas of the target replica after splitting and migration target addresses of the subreplicas; and
  executing the replica splitting task by invoking a thread in a thread pool, to split the target replica into the subreplicas based on the target number of the subreplicas and migrate at least one of the subreplicas based on the migration target addresses of the subreplicas.

In a second aspect, an embodiment of the present disclosure provides a device of scheduling a distributed database, comprising:
  a detection unit configured to detect load states of respective storage units in any first storage node in a distributed database, and determining a hotspot partition of any first storage unit based on the load states;
  a task generating unit configured to generate generating a replica splitting task for a target replica stored in the hotspot partition, the replica splitting task comprising the target number of subreplicas of the target replica after splitting and migration target addresses of the subreplicas; and
  an executing unit configured to executing the replica splitting task by invoking a thread in a thread pool, to split the target replica into the subreplicas based on the target number of the subreplicas and migrate at least one of the subreplicas based on the migration target addresses of the subreplicas.

In a third aspect, an embodiment of the present disclosure provides an electronic device, comprising: at least one processor and a memory;
  the memory storing computer execution instructions; and
  the at least one processor executing the computer execution instructions stored in the memory, causing the at least one processor to perform the method of the first aspect and various possible designs of the first aspect.

In a fourth aspect, an embodiment of the present disclosure provides a computer readable storage medium, wherein computer execution instructions are stored in the computer readable storage medium, the computer execution instructions, when executed by a processor, implementing the method of the first aspect and various possible designs of the first aspect is implemented.

In a fifth aspect, an embodiment of the present disclosure provides a computer program product, comprising computer execution instructions which, when executed by a processor, implement the method of the first aspect and various possible designs of the first aspect is implemented.

The embodiments provide a method, device, and storage medium for scheduling a distributed database. Load states of respective storage units in any first storage node in a distributed database are detected by any of a plurality of management devices of a distributed database, and a hotspot partition of any first storage unit is determined based on the load states; a replica splitting task for a target replica stored in the hotspot partition is generated, the replica splitting task comprising the target number of subreplicas of the target replica after splitting and migration target addresses of the subreplicas; the replica splitting task is executed by invoking a thread in a thread pool, to split the target replica into the subreplicas based on the target number of the subreplicas and migrate at least one of the subreplicas based on the migration target addresses of the subreplicas. In the distributed database, replica splitting can be performed automatically based on a load state, so that a disk hotspot problem can be reduced, thereby avoiding affecting read-write performance and preventing a disk from being damaged and improving the disaster-tolerance capability of the distributed database.

BRIEF DESCRIPTION OF THE DRAWINGS

In order to illustrate the embodiments of the present disclosure or the technical solutions more clearly in conventional solutions, a brief introduction will be made below to the drawings to be used in the description of the embodiments or conventional solutions. Obviously, the drawings in the following description are some of the embodiments of the present disclosure, and those of ordinary skill in the art can obtain other drawings based on these drawings without the exercise of any creative effort.

DETAILED DESCRIPTION

In order to make the purpose, technical solutions and advantages of the embodiments of the present disclosure clearer, the technical solutions in the embodiments of the present disclosure will be described clearly and completely in the following in conjunction with the accompanying drawings in the embodiments of the present disclosure, and it is obvious that the described embodiments are a part of the embodiments of the present disclosure and not all of the embodiments. Based on the embodiments in the present disclosure, all other embodiments obtained by a person of ordinary skill in the art without creative labor fall within the scope of protection of the present disclosure.

In the embodiments of the present disclosure, "first", "second" and the like are used only for descriptive convenience and are not to be construed as indicating or implying relative importance or implicitly specifying the number of technical features indicated. The meaning of "more than one" is more than two, unless otherwise explicitly and specifically limited.

Compared with a traditional database, a distributed database introduces a consensus algorithm into a database technology, thereby implementing consistency of a plurality of replicas of data, and naturally guaranteeing high availability of a system. A plurality of replicas of data are stored in a distributed database, and there is a primary/secondary relationship among a plurality of replicas of the same piece of data, which can be respectively referred to as a primary replica and a secondary replica, in which the primary replica usually provides a read-write service, and the secondary replica provides a read-only service. Due to the existence of functional differences between the primary and secondary replicas, it is necessary to schedule the replicas evenly among a plurality of nodes in the system.

In conventional solutions, some replicas in a distributed database may have a certain read/write pressure. Although there are a plurality of replicas, there may still be a large read/write requirement, which causes the replica to be in a read-write state for a long time, leading to a disk where the replica is located generating heat, causing a disk hotspot problem, influencing read/write performance, and even causing a disk to be damaged.

In order to solve the described technical problem, the embodiments of the present disclosure provide a method of scheduling a distributed database, which can split a replica of a hotspot partition into a plurality of subreplicas based on a load state and migrate same, thereby reducing the heating of the hotspot partition and reducing a disk hotspot problem, so as to avoid affecting read and write performance and avoid disk damage, and improve the disaster-tolerance capability of a distributed database.

Figure 1:
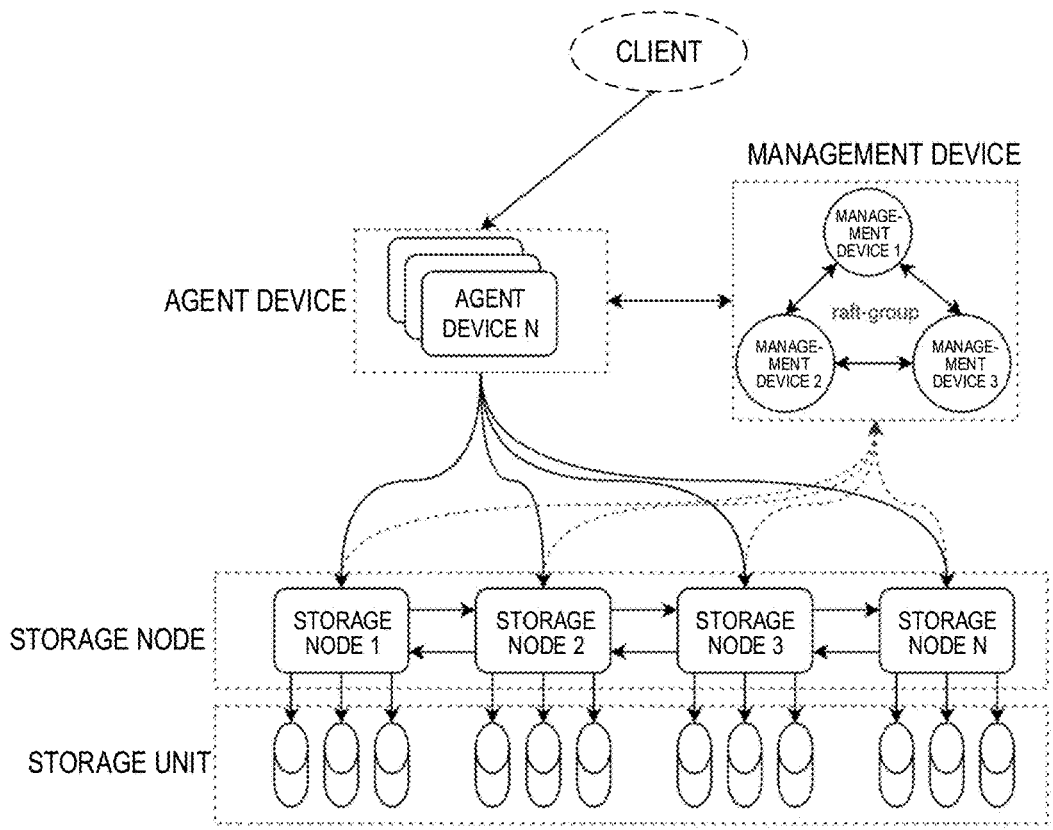
FIG. 1 is an example system architecture diagram of a method of scheduling a distributed database provided by embodiments of the present disclosure.

The method of scheduling a distributed database provided by the present disclosure can be applied to the distributed database system as shown in FIG. 1, comprising a management device and a storage node cluster, wherein each storage node comprises a plurality of storage units, and can further comprise an agent device, wherein the management device can manage the whole storage node cluster, comprising a management storage node, a storage unit managed by the storage node, a replica, replica scheduling, a DDL (Data Definition Language), a replica location cache, etc., high availability can be achieved through the Raft-Group technology; a storage node is used for providing a read and write service of a replica, and managing a plurality of storage units (e. g. magnetic disks), and high availability between replicas can be achieved by means of a Raft-Graph; an agent device facing a client is used for receiving a read/write request of the client, shielding an internal structure of a cluster from the outside; after receiving the read/write request of the client, the agent device can send the read/write request to a management device; the management device determines, based on load balancing, location information of a read/write replica, and returns same to the agent device; and then the agent device reads and writes the replica based on the location information. Herein, the management device can be configured as a plurality of management devices, for example, three management devices are configured, so as to implement the disaster-tolerance of three replicas of the management device, and a raft-group can be used to implement high availability. The method of scheduling a distributed database of the present disclosure can be executed by any management device.

According to the scheduling method in the embodiments of the present disclosure, a management device can detect load states of respective storage units in any first storage node in a distributed database, and determine a hotspot partition of any first storage unit based on the load states; a replica splitting task for a target replica stored in the hotspot partition is generated, the replica splitting task comprising the target number of subreplicas of the target replica after splitting and migration target addresses of the subreplicas; the replica splitting task is executed by invoking a thread in a thread pool, to split the target replica into the subreplicas based on the target number of the subreplicas and migrate at least one of the subreplicas based on the migration target addresses of the subreplicas. In the distributed database, replica splitting can be performed automatically based on a load state, so that a disk hotspot problem can be reduced, thereby avoiding affecting read-write performance and preventing a disk from being damaged and improving the disaster-tolerance capability of the distributed database.

The method of scheduling a distributed database of the present disclosure will be described in detail below with reference to specific embodiments.

Figure 2:
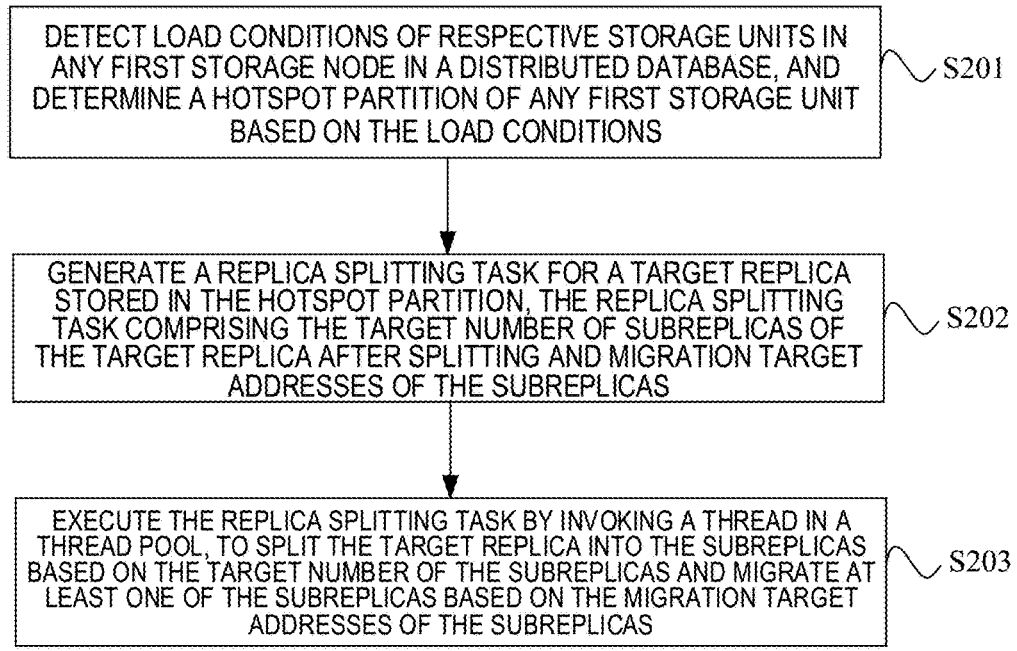
FIG. 2 is an example schematic flowchart of a method of scheduling a distributed database provided by embodiments of the present disclosure.

Referring to FIG. 2, which is a schematic flowchart of a method of scheduling a distributed database according to an embodiment of the present disclosure. The method of the present embodiment can be applied to any management device among a plurality of management devices of a distributed database. The management device is connected to a plurality of storage nodes of the distributed database, and each storage node comprises a plurality of storage units (e. g. magnetic disks). The method of scheduling a distributed database comprises:

At S201, load states of respective storage units in any first storage node in a distributed database are detected, and a hotspot partition of any first storage unit is determined based on the load states.

In this embodiment, the management device obtains the load state of individual storage unit in any storage node in the distributed database, for example, the read/write pressure, especially the read/write pressure of each partition in individual storage unit, or the read/write pressure of a certain stored replica. Taking a first storage node as an example (wherein the first storage node is any storage node), a first storage node can actively detect load states of a plurality of storage nodes comprised therein, and send same to a management device; Alternatively, the management device sends a detection instruction to the first storage node, and then the first storage node actively detects load states of a plurality of storage nodes comprised in the detection instruction, and sends the detection instruction to the management device.

After obtaining the load state of individual storage unit in the first storage node, the management device may determine a hotspot partition of any storage unit in the first storage node based on the load state. Taking the first storage unit (wherein the first storage unit is any storage unit in the first storage node) as an example, if read-write pressure of a certain partition in the first storage unit reaches a predetermined read-write pressure threshold, the partition increases in temperature due to increase of read-write pressure, and the partition may be determined to be a hotspot partition. Certainly, the hotspot partition may also be determined by collecting temperatures of the individual partitions of the first storage node.

At S202, a replica splitting task for a target replica stored in the hotspot partition is generated, the replica splitting task comprising the target number of subreplicas of the target replica after splitting and migration target addresses of the subreplicas.

In this embodiment, in order to avoid overheating of the hotspot partition and reduce read-write pressure of the hotspot partition, a replica with larger read-write pressure stored in the hotspot partition may be determined as a target replica. For example, if a replica is in a read-write state for a long time (longer than a predetermined duration), the target replica is split, i.e., the target replica is split into a plurality of subreplicas, and at least one subreplica is migrated from a partition where the at least one subreplica is located. Thus, read-write pressure of the partition can be reduced, thereby overheat of the hotspot partition can be avoided.

Further, in this embodiment, the management device may first determine the target number of the subreplicas and the migration target addresses of the subreplicas after the target replica is split, and then a replica splitting task is generated based on the target number of the subreplicas and the migration target addresses of the subreplicas.

Optionally, the subreplica may be migrated to further partitions of the first storage node or migrated to a partition of further storage units in the first storage node. Alternatively, a part of the subreplicas may be migrated to further partitions of the first storage node, and a part of the subreplicas may be migrated to partitions of further storage units in the first storage node. However, the target partition to which the target partition is migrated cannot be a hotspot partition, otherwise, the read/write pressure of the target partition is further increased, increasing the temperature of the target partition. Therefore, in this embodiment, the non-hotspot partition of the first storage unit and/or further storage units may be determined based on the load state of individual storage unit in the first storage node. For example, a partition where read-write pressure fails to reach a predetermined read-write pressure threshold, and thereby determining the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node. The target number of subreplicas may be determined based on the number of the non-hotspot partitions. For example, if the migration target address of the subreplica comprises only the non-hotspot partition of the first storage unit, the target number of the subreplicas may be increased appropriately (at most the same as the non-hotspot score number) if there are more non-hotspot partition in the first storage unit; the target number of subreplicas may be reduced appropriately (at most the same as the non-hotspot score amount) if there are fewer non-hotspot partitions in the first storage unit. If the migration target address of the subreplica is other cases, the determination of the target number of the subreplicas is similar to the foregoing cases, and is not repeated herein. In addition, the size of the subreplica may also be determined based on the size of the available storage space in the non-hotspot partition and/or the read/write pressure, so as to ensure that the non-hotspot partition can accommodate the subreplica and that the read/write pressure after migration is not excessive.

At S203, the replica splitting task is executed by invoking a thread in a thread pool, to split the target replica into the subreplicas based on the target number of the subreplicas and migrate at least one of the subreplicas based on the migration target addresses of the subreplicas.

In this embodiment, after the management device generates a replica splitting task, threads in the thread pool may be invoked to execute the replica splitting task, A thread, when executing a replica splitting task, may split a target replica into a plurality of subreplicas according to a target number of subreplicas, and migrating at least one subreplica based on the migration target address of the subreplica, so as to realize splitting of the target replica, The read-write pressure of the hotspot partition is reduced, thereby reducing the temperature of the hotspot partition and avoiding overheating of the hotspot partition.

Alternatively, replica splitting tasks may be added to a task queue, and the task queue invokes threads from a thread pool to execute the tasks in the task queue. Optionally, the management device may set priorities for the tasks in the task queue, invoke threads according to a descending order of the priorities of the tasks, and preferentially invoke the threads for processing. With regard to the replica splitting task, the priority can be determined according to the magnitude or temperature of the read-write pressure in the hotspot partition where the replica splitting task is located, and if the read-write pressure is larger or the temperature is higher, the priority is higher, and the replica splitting can be performed preferentially.

The method of scheduling a distributed database provided in the present embodiment comprises: detecting load states of respective storage units in any first storage node in a distributed database, and determining a hotspot partition of any first storage unit based on the load states; generating a replica splitting task for a target replica stored in the hotspot partition, the replica splitting task comprising the target number of subreplicas of the target replica after splitting and migration target addresses of the subreplicas; executing the replica splitting task by invoking a thread in a thread pool, to split the target replica into the subreplicas based on the target number of the subreplicas and migrate at least one of the subreplicas based on the migration target addresses of the subreplicas. In the distributed database, replica splitting can be performed automatically based on a load state, so that a disk hotspot problem can be reduced, thereby avoiding affecting read-write performance and preventing a disk from being damaged and improving the disaster-tolerance capability of the distributed database.

Based on the foregoing embodiments, the method of scheduling a distributed database in an embodiment of the present disclosure may further provide a scheduling manner for merging replicas. The management device may generate a replica merging task for the plurality of split subreplicas based on the size of the replica capacity and the read/write pressure, or a replica merging task is generated for different replicas, and then threads in the thread pool can be invoked to execute the replica merging task, The thread may implement replica merging when performing a replica splitting task. Optionally, the replica merging tasks may be added to a task queue, and the task queue invokes threads from a thread pool to execute the tasks in the task queue.

On the basis of any of the foregoing embodiments, the method of scheduling a distributed database in an embodiment of the present disclosure further comprises scheduling at a level of storage node, comprising distributed database scheduling in the case that a storage node is offline and/or is temporarily broken down for maintenance. In an embodiment, a scheduling process of distributed database in the case that a storage node being offline is as follows:

At S301, in response to a detection of the first storage node being offline, migration target addresses of one or more replicas in the first storage node are determined based on load states of further storage nodes in the distributed database, and a first replica migration task is generated based on the migration target addresses of the one or more replicas;

At S302, the first replica migration task is executed by invoking a thread in the thread pool, to migrate the one or more replicas based on the migration target addresses of the one or more replicas.

In this embodiment, the management device may detect the state of respective storage nodes and determine whether there is a storage node being offline, wherein detecting the state of respective storage nodes may be implemented by means of a heartbeat protocol or the like; alternatively, the administrator may send an instruction or a notification that the storage node is offline to the management device, or modify the state of the storage node in the management device (for example, mark that a certain storage node is offline permanently or is shielded). When it is determined that the first storage node is offline, the replica in the first storage node may be migrated to further storage nodes in the distributed database. In addition, in the migration process, a load state of a storage node of the storage node needs to be considered, and one or more storage nodes (which may be further detailed to a storage unit or even a partition) with a low read-write pressure may be determined, based on load states of further storage nodes, as a migration target address. In addition, the first replica migration task is generated based on the migration target addresses of one or more replicas in the first storage node.

Similar to the replica splitting task in the foregoing embodiment, after the management device generates the first replica migration task, a thread in a thread pool may be invoked to execute a first replica migration task. When executing the first replica migration task, the thread migrates one or more replicas based on migration target addresses of the one or more replicas. It is ensured that the replica of the first storage node can be migrated to further storage nodes to continue to be read and written after the first storage node gets offline. Optionally, the first replica migration tasks may be added to the task queue, and the task queue invokes the threads from the thread pool to execute the tasks in the task queue, which is similar to the above embodiments and will not be repeated here.

In a further embodiment, the distributed database scheduling process in the case of temporary fault maintenance is as follows:

At S311, in response to receiving a temporary fault maintenance message of the first storage node, for any of primary replicas comprised in the first storage node, in accordance with a determination that at least one of secondary replicas corresponding to the primary replica is located in a further storage node in the distributed database, a first role switching task is generated for the primary replica and any of secondary replicas;

At S312, the first role switching task is executed by invoking a thread in the thread pool, to perform role switching on the primary replica and any of the secondary replicas.

In this embodiment, a management personnel may send a temporary fault maintenance message of the first storage node to a management device, and certainly, a temporary fault maintenance state of the first storage node may also be detected in another manner. Since the first storage node may comprise some primary replicas, and the primary replica provides reading and writing services and can update and synchronize the replicas to the secondary replica. Since the secondary replicas only provide reading services, if a certain primary replica is located in the first storage node, and at least one corresponding secondary replica is located in further storage nodes in the distributed database, while the first storage node is temporarily broken down for maintenance, the secondary replica(s) located in further storage node(s) may continue to provide read services. However, a write service cannot be provided, and further secondary replicas cannot be updated and synchronized, and therefore any secondary replica located in further storage nodes can be switched to a primary replica, i.e., role switching is performed between the primary replica of the first storage node and any secondary replica among further storage nodes. In this way, a read/write service can be provided after the secondary replica is switched to the primary replica. Herein, the load state of the storage node in which the secondary replica is located can also be considered for the selection of any of the further storage nodes.

The management device may generate a first role switching task for the primary replica of the first storage node and any secondary replica in any of the further storage nodes. Similar to the replica splitting task and the first replica migration task in the foregoing embodiments, after the management device generates the first role switching task, a thread in a thread pool can be invoked to execute a first role switching task. When executing the first role switching task, the thread implements the switching from a primary replica of a first storage node to a secondary replica, switching any of the further storage nodes from the secondary replica to the primary replica, so as to ensure the update and synchronization of the replica during the temporary fault maintenance of the first storage node. Optionally, the first role switching task may be added to a task queue, and the task queue invokes a thread from a thread pool to execute the tasks in the task queue, which is similar to the above embodiments and will not be repeated here.

In a further embodiment, the process of scheduling a distributed database in the case of temporary maintenance may also be as follows:

At S321, in response to receiving a temporary fault maintenance message of the first storage node, for any of primary replicas comprised in the first storage node, in accordance with a determination that all secondary replicas corresponding to the primary replica are located in the first storage node, migration target addresses of the primary replica and a corresponding secondary replica are determined based on load states of further storage nodes in the distributed database, and a second replica migration task is generated based on the migration target addresses of the primary replica and the corresponding secondary replica;

At S322, the second replica migration task is executed by invoking a thread in the thread pool, to migrate the primary replica and the corresponding secondary replica based on the migration target addresses of the primary replica and the corresponding secondary replica.

In this embodiment, a certain primary replica and all corresponding secondary replicas may be located on the first storage node. If the first storage node is in temporary fault maintenance, the primary replica and the corresponding secondary replica cannot provide services. Therefore, the primary replica and the corresponding secondary replica need to be migrated to one or more further storage nodes in the distributed database. The migrated storage node may be selected based on load states of further storage nodes, so as to determine a migration target address of the primary replica and one or more corresponding secondary replicas.

The management device may generate a second replica migration task based on the migration target addresses of the primary replica and the corresponding secondary replica. Similar to the replica splitting task and the first replica migration task in the foregoing embodiments, after the management device generates the second replica migration task, a thread in a thread pool may be invoked to execute a second replica migration task. When executing the second replica migration task, the thread implements migration of a primary replica of a first storage node and one or more corresponding secondary replicas based on corresponding migration target addresses. Optionally, the second replica migration tasks may be added to the task queue, and the task queue invokes the threads from the thread pool to execute the tasks in the task queue, which is similar to the above embodiments and will not be repeated here.

On the basis of any of the foregoing embodiments, the method of scheduling a distributed database in an embodiment of the present disclosure further comprises scheduling for the primary replica. In one embodiment, the scheduling process for the primary replica is as follows:

At S401, a replica state of a primary replica comprised in the first storage node is detected; in accordance with a determination that a replica state of the primary replica is abnormal, a second role switching task for any secondary replica corresponding to the primary replica is generated and a first deletion task for the primary replica is generated.

At S402, the second role switching task and the first deletion task are executed by invoking a thread in the thread pool, to perform role switching on the secondary replica and delete the primary replica.

In this embodiment, considering different services provided by the primary replica and the secondary replica, the management device can detect the state of the replica of the primary replica in any storage node. Taking a first storage node as an example, the first storage node can actively detect the state of the replica of the primary replica comprised therein, and send same to the management device; alternatively, the management device sends a detection instruction to the first storage node, and then the first storage node actively detects the replica state of the primary replica comprised therein, and sends the detection instruction to the management device. If it is determined that the state of a replica of any primary replica in the first storage node is abnormal, then any secondary replica corresponding to the primary replica is selected and is switched to be the primary replica, or roles of the primary replica and any secondary replica are interchanged, so as to ensure that a read-write service can be continuously provided. The original primary replica is deleted at last. The load state of the storage node where the secondary replica is located may also be considered for the selection of any of the secondary replicas.

The management device may generate a second role switching task for any secondary replica corresponding to the primary replica, and generate a first deletion task for the primary replica. Similar to the tasks such as the replica splitting task, the first replica migration task, and the first role switching task in the foregoing embodiments, after the management device generates the second role switching task and the first deletion task, threads in the thread pool may be invoked to execute the second role switching task and the first deletion task. When executing the second role switching task and the first deletion task, the thread implementing the role switching of the secondary replica and deleting the original primary replica. Optionally, the second role switching task and the first deletion task may be added to a task queue, and the task queue invokes a thread from a thread pool to execute the tasks in the task queue, which is similar to the above embodiments and will not be repeated here.

In a further embodiment, the process of scheduling the primary replica is as follows:

At S411, whether any primary replica comprised in the first storage node satisfies a predetermined judgement rule is determined. The judgement rule comprises: whether label information of the primary replica matches label information of the first storage node, or whether a current arrangement strategy of the primary replica matches a predetermined arrangement strategy, or whether a predetermined affinity relationship of the primary replica matches the first storage node;

At S412, if the primary replica fails to satisfy the predetermined judgement rule, a third role switching task is generated for any secondary replica corresponding to the primary replica that satisfies the predetermined judgement rule, and a second deletion task for the primary replica;

At S413, the third role switching task and the second deletion task are executed by invoking a thread in the thread pool, to perform role switching on the secondary replica and delete the primary replica.

In this embodiment, in view of the difference in the services provided by the primary replica and the secondary replica. Some policies are pre-configured for the primary replica, comprising but not limited to, a tag matching rule, an arrangement strategy, and an affinity relation rule. Herein, the tag matching rule is to pre-configure some tag information for the primary replica, some tag information is also pre-configured for the storage node, and then the primary replica is deployed based on the matching degree of the tag information, i.e., the primary replica is deployed to the storage node that best matches the label information of the primary replica. The arrangement policy defines how the primary replica is specifically arranged, for example, on which storage node, etc.; and the affinity relationship rule defines a storage node which is the most affinity to the primary replica, i.e. on which storage nodes the primary replica is deployed is most suitable. A determination is performed on any of the primary replicas comprised in the first storage node based on the described strategy, comprising judging whether the tag information of the primary replica matches the tag information of the first storage node, or whether the current arrangement policy of the primary replica matches a predetermined arrangement policy, or whether the predetermined affinity of the primary replica matches the first storage node (i.e., whether the first storage node is an affinity storage node of the primary replica). If the primary replica fails to meet the above judgment rule, it indicates that it is inappropriate to arrange the primary replica on the first storage node. Therefore, a secondary replica satisfying the above determination rule can be found from further storage nodes, and the secondary replica can be switched to the primary replica, or performing role exchange between the primary replica and the secondary replica, and deleting the original primary replica at last. The selection of the secondary replica may also consider the load state of the storage node where the secondary replica is located.

The management device may generate a third role switching task for the secondary replicas that satisfy the above determination rules, and generating a second deletion task for the primary replica, which is similar to the tasks such as a replica splitting task, a first replica migration task and a first role switching task in the described embodiments. After the management device generates the third role switching task and the second deletion task, threads in the thread pool may be invoked to execute the third role switching task and the second deletion task. When executing the third role switching task and the second deletion task, the thread implements the role switching of the secondary replica and deleting the original primary replica. Optionally, the third role switching task and the second deletion task may be added to a task queue, and the task queue invokes a thread from a thread pool to execute the tasks in the task queue, which is similar to the above embodiments and will not be repeated here.

On the basis of any of the foregoing embodiments, the method of scheduling a distributed database in an embodiment of the present disclosure further comprises:

At S501, a replica state of a secondary replica comprised in the first storage node is detected, and a replica reconstruction task for the secondary replica is generated if a replica state of any primary replica is abnormal;

At S502, the replica reconstruction task is executed by invoking a thread in the thread pool, to perform a post-deletion reconstruction on the secondary replica.

In this embodiment, the management device can also detect the replica state of the secondary replica in any storage node. Taking a first storage node as an example, the first storage node can actively detect the replica state of the secondary replica comprised therein and send same to the management device; alternatively, the management device sends a detection instruction to the first storage node, and then the first storage node passively detects the replica state of the secondary replica comprised in the detection instruction, and sends the detection instruction to the management device. If it is determined that the replica state of any secondary replica of the first storage node is abnormal, the secondary replica may be reestablished, i.e., the original secondary replica is deleted and a new replica is created.

A management device may generate a replica reconstruction task for a secondary replica with an abnormal replica state, which is similar to the tasks such as a replica splitting task, a first replica migration task, and a first role switching task in the described embodiments. After generating the replica reconstruction task, the management device may invoke a thread in a thread pool to execute the replica reconstruction task. When executing the replica reconstruction task, the thread deletes an original secondary replica and establishes a new replica. Optionally, a replica reconstruction task may be added to a task queue, and the task queue invokes a thread from a thread pool to execute a task in the task queue, which is similar to the foregoing embodiments and will not be repeated herein.

On the basis of any of the foregoing embodiments, the method of scheduling a distributed database in an embodiment of the present disclosure further comprises:

At S511, the total number of any primary replica and corresponding secondary replicas in the distributed database are obtained, in accordance with a determination that the total number is less than a predetermined number threshold, a replica replenishment task is generated based on load states of respective storage nodes in the distributed database;

At S512, the replica rearrangement task is executed by invoking a thread in the thread pool, to create a secondary replica corresponding to the primary replica in one or more of the storage nodes.

In this embodiment, in order to ensure the disaster-tolerance capability, a predetermined number threshold is usually set for the total number of primary replicas and corresponding secondary replicas. Herein, the predetermined quantity threshold may be different for the primary replica and the corresponding secondary replica of different services and/or different degrees of importance. For example, for the primary replica and the corresponding secondary replica of the key service, the predetermined number threshold may be set to 5, i.e., five-replica disaster-tolerance is implemented instead of the primary replica and the corresponding secondary replica of the key service. The predetermined quantity threshold may be set to 3, i.e., three-replica disaster-tolerance is implemented.

Further, if the total number of any primary replica and corresponding secondary replica in the distributed database is less than a predetermined number threshold, it indicates that there is a replica missing, and replica replenishment can be performed. The management device can select one or more storage nodes based on the load state of respective storage nodes in the distributed database, to replenish the replicas on the one or more storage nodes. The reduction of the disaster-tolerance ability due to the lack of the replicas is avoided.

The management device may generate a replica replenishment task and invoke a thread in a thread pool to execute the replica replenishment task, and when executing the replica replenishment task, the thread creates a secondary replica corresponding to a primary replica in one or more storage nodes, so as to ensure the number of replicas. Optionally, a replica replenishment task may be added to a task queue, and the task queue invokes a thread from a thread pool to execute a task in the task queue, which is similar to the above embodiments and will not be repeated here.

In the above embodiments, the management device recognizes various scheduling requirements through detection, and uniformly generates various scheduling tasks. When various scheduling tasks are generated, a scheduling task can be generated based on a predetermined basic scheduling method (a method of task generation). A basic scheduling method (a method of task generation) is used for encapsulating public methods and members of specific scheduling classes. A predetermined scheduling base class can be used to abstract public functions of different scheduling tasks, such as a scheduler name, a scheduling period, a scheduler switch, a scheduling thread, and a scheduling specific implementation, wherein the scheduling specific implementation (Schedule) is a virtual method. The method is implemented by a lower-layer specific scheduling method. Further, the management device adds various scheduling tasks to the task queue, and the task queue invokes the threads from the thread pool to execute the tasks in the task queue. Optionally, the management device may set priorities for various scheduling tasks in the task queue, and then may invoke threads based on the order of the priority levels of the tasks, and the task with a high priority level preferentially invokes the threads for processing.

Figure 3:
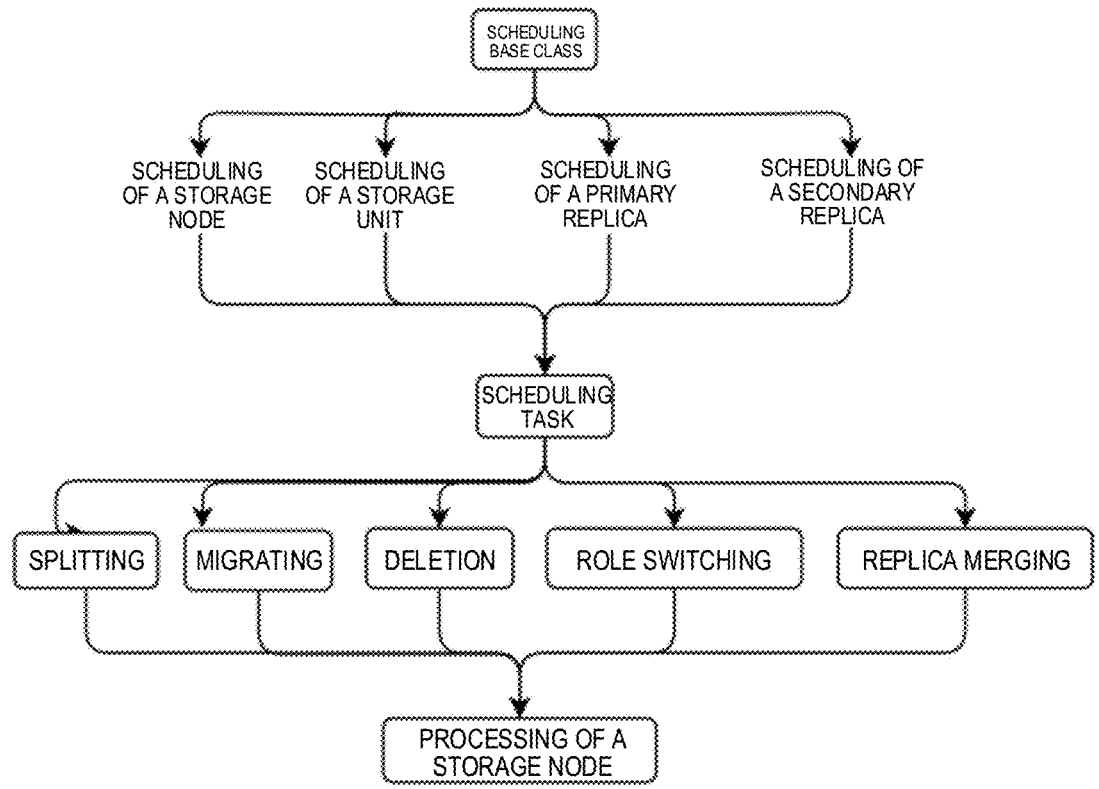
FIG. 3 is an example schematic diagram of multi-tier distributed database scheduling of a method of scheduling a distributed database provided by embodiments of the present disclosure.

In addition, the scheduling process in respective of the above embodiments can be divided into different layers, as shown in FIG. 3, the uppermost layer is a basic method of scheduling used for encapsulating public methods and members of a specific scheduling class; a second layer is a specific implementation for a method of scheduling; a third layer is scheduling tasks generated by different scheduling methods, comprising replica splitting, replica merging, etc.; finally, all scheduling tasks are forwarded to the storage nodes for specific execution. A multi-level scheduling task can process many problem scenarios such as a node fault, a disk fault, and a disk hotspot; furthermore, the storage and scheduling are separated, so that seamless storage engine docking can be implemented, and different storage engines can be adapted; different disaster-tolerance and capacity expansion policies can be adopted for storage and scheduling, for example, a management device can be configured with three-replica disaster-tolerance, i.e., three management devices are adopted, and storage nodes can be configured with five-replica disaster-tolerance and nine-replica disaster-tolerance, etc.; multi-level scheduling task can implement different disaster-tolerance strategies such as service level, rack level and data center level; the multi-level scheduling may adopt mutually independent schedulers to perform scheduling respectively, and different schedulers may start and stop as required and configure a scheduling period as required. Ultimately, different scheduling tasks are executed on a storage node, which can effectively deal with different scenarios and handle many problem scenarios such as storage node fault, disk fault, and disk hotspots.

Figure 4:
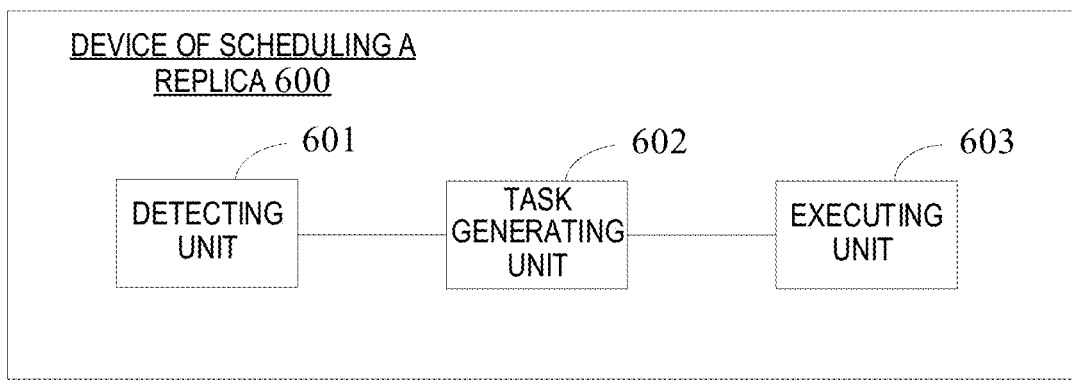
FIG. 4 is a structural block diagram of a device of scheduling a distributed database provided by embodiments of the present disclosure.

Corresponding to the method of scheduling a distributed database in the foregoing embodiment, FIG. 4 is a structural block diagram of a device of scheduling a distributed database according to an embodiment of the present disclosure. For ease of description, only parts related to the embodiments of the present disclosure are shown. Referring to FIG. 4, the device of scheduling a distributed database 600 comprises: a detecting unit 601, a task generating unit 602, and an executing unit 603.

Herein, the detection unit 601 is configured to detect load states of respective storage units in any first storage node in a distributed database, and determining a hotspot partition of any first storage unit based on the load states;

a task generating unit 602 is configured to generate generating a replica splitting task for a target replica stored in the hotspot partition, the replica splitting task comprising the target number of subreplicas of the target replica after splitting and migration target addresses of the subreplicas;

The executing unit 603 is configured to executing the replica splitting task by invoking a thread in a thread pool, to split the target replica into the subreplicas based on the target number of the subreplicas and migrate at least one of the subreplicas based on the migration target addresses of the subreplicas.

In one or more embodiments of the present disclosure, when generating the replica splitting task for the target replica stored in the hotspot partition, the task generating unit 602 is configured to:

determine the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node.

In one or more embodiments of the present disclosure, the task generating unit 602 is further configured to, when the detecting unit 601 detects the first storage node being offline, determine migration target addresses of one or more replicas in the first storage node based on load states of further storage nodes in the distributed database, and generate a first replica migration task based on the migration target addresses of the one or more replicas;

The executing unit 603 is further configured to execute the first replica migration task by invoking a thread in the thread pool, to migrate the one or more replicas based on the migration target addresses of the one or more replicas.

In one or more embodiments of the present disclosure, the task generating unit 602 is further configured to, in response to receiving a temporary fault maintenance message of the first storage node, for any of primary replicas comprised in the first storage node, in accordance with a determination that at least one of secondary replicas corresponding to the primary replica is located in a further storage node in the distributed database, generate a first role switching task for the primary replica and any of secondary replicas The executing unit 603 is further configured to execute the first role switching task by invoking a thread in the thread pool, to perform role switching on the primary replica and any of the secondary replicas.

In one or more embodiments of the present disclosure, the task generating unit 602 is further configured to, in response to receiving a temporary fault maintenance message of the first storage node, for any of primary replicas comprised in the first storage node, in accordance with a determination that all secondary replicas corresponding to the primary replica are located in the first storage node, determine migration target addresses of the primary replica and a corresponding secondary replica based on load states of further storage nodes in the distributed database, and generate a second replica migration task based on the migration target addresses of the primary replica and the corresponding secondary replica;

The executing unit 603 is further configured to execute the second replica migration task by invoking a thread in the thread pool, to migrate the primary replica and the corresponding secondary replica based on the migration target addresses of the primary replica and the corresponding secondary replica.

In one or more embodiments of the present disclosure, the detecting unit 601 is further configured to detect a replica state of a primary replica comprised in the first storage node;

The task generating unit 602 is further configured to, in accordance with a determination that a replica state of the primary replica is abnormal, generate a second role switching task for any secondary replica corresponding to the primary replica and generate a first deletion task for the primary replica;

The executing unit 603 is further configured to execute the second role switching task and the first deletion task by invoking a thread in the thread pool, to perform role switching on the secondary replica and delete the primary replica.

In one or more embodiments of the present disclosure, the detecting unit 601 is further configured to determine whether any primary replica comprised in the first storage node satisfies a predetermined judgement rule, the judgement rule comprising: whether label information of the primary replica matches label information of the first storage node, or whether a current arrangement strategy of the primary replica matches a predetermined arrangement strategy, or whether a predetermined affinity relationship of the primary replica matches the first storage node;

the task generating unit 602 is further configured to, if the primary replica fails to satisfy the predetermined judgement rule, generate a third role switching task for any secondary replica corresponding to the primary replica that satisfies the predetermined judgement rule, and a second deletion task for the primary replica;

The executing unit 603 is further configured to execute the third role switching task and the second deletion task by invoking a thread in the thread pool, to perform role switching on the secondary replica and delete the primary replica.

In one or more embodiments of the present disclosure, the detecting unit 601 is further configured to detect a replica state of a secondary replica comprised in the first storage node;

The task generating unit 602 is further configured to generate a replica reconstruction task for the secondary replica if a replica state of any primary replica is abnormal;

The executing unit 603 is further configured to execute the replica reconstruction task by invoking a thread in the thread pool, to perform a post-deletion reconstruction on the secondary replica.

In one or more embodiments of the present disclosure, the task generating unit 602 is further configured to obtain the total number of any primary replica and corresponding secondary replicas in the distributed database, in accordance with a determination that the total number is less than a predetermined number threshold, generate a replica replenishment task based on load states of respective storage nodes in the distributed database;

The executing unit 603 is further configured to execute the replica rearrangement task by invoking a thread in the thread pool, to create a secondary replica corresponding to the primary replica in one or more of the storage nodes.

In one or more embodiments of the present disclosure, a replica location inquiry unit is configured to receive a client replica read request sent by an agent device, and determining location information of a replica to be returned based on load states of a primary replica and a secondary replica corresponding to a requested replica; send, to the agent device, the location information of the replica to be returned, to cause the agent device to read a replica and return it to a client based on the location information of the replica to be returned.

The device of scheduling a distributed database provided in this embodiment may be used to execute the technical solutions of the foregoing method embodiments. Implementation principles and technical effects of the device of scheduling a distributed database are similar to those of the foregoing method embodiments and are not repeatedly described herein in this embodiment.

Figure 5:
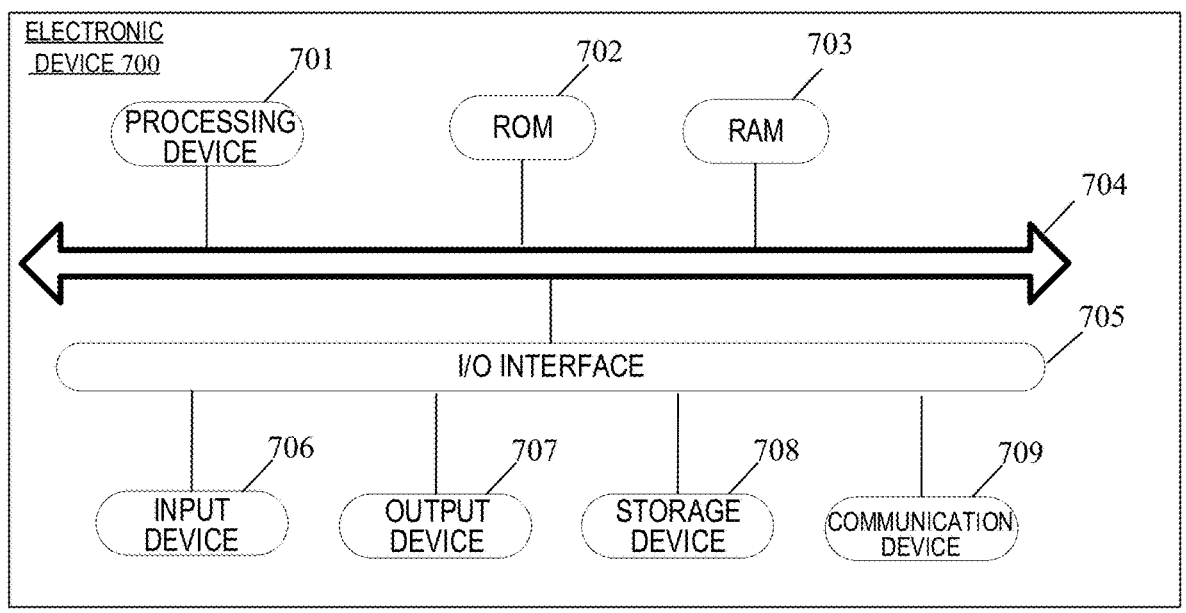
FIG. 5 is a schematic diagram of hardware structure of an electronic device provided by embodiments of the present disclosure.

Referring to FIG. 5, it shows a schematic structural diagram of an electronic device 700 suitable for implementing an embodiment of the present disclosure. The electronic device 700 may be a terminal device or a server. The terminal device may comprise, but is not limited to, a mobile terminal such as a mobile phone, a laptop computer, a digital broadcast receiver, a personal digital assistant (Personal Digital Assistant, PDA for short), a tablet computer (Portable Android Device, PAD for short), a portable multimedia player (Portable Media Player, PMP for short), a vehicle-mounted terminal (for example, a vehicle-mounted navigation terminal), and the like, and a fixed terminal such as a digital TV, a desktop computer, and the like. The electronic device shown in FIG. 5 is merely an example and should not bring any limitation to the functions and scope of use of embodiments of the present disclosure.

As shown in FIG. 5, the electronic device 700 may comprise a processing device (e. g., a central processing unit, a graphics processor, etc.) 701 that may perform various suitable actions and processes in accordance with a program stored in a read only memory (ROM) 702 or a program loaded into a random access memory (RAM) 703 from the storage device 708. A variety of programs and data necessary for the operation of the electronic device 700 are also stored in the RAM 703. The processing device 701, the ROM 702, and the RAM 703 are connected to each other via the bus 704. An input/output (I/O) interface 705 is also connected to the bus 704.

In general, the following devices may be connected to the I/O interface 705: an input device 706 comprising, for example, a touch screen, a touch pad, a keyboard, a mouse, a camera, a microphone, an accelerometer, a gyroscope, or the like; an output device 707 comprising, for example, a liquid crystal display (LCD), a speaker, a vibrator, or the like; a storage device 708 comprising, for example, a magnetic tape, a hard disk, or the like; and a communication device 709. The communication device 709 can allow the electronic device 700 to communicate wirelessly or wired with other devices to exchange data. While FIG. 5 illustrates the electronic device 700 with a variety of means, it is to be understood that not all of the illustrated means are required to be implemented or provided. More or fewer devices may alternatively be implemented or provided.

In particular, the processes described above with reference to the flowcharts can be implemented as computer software programs in accordance with embodiments of the present disclosure. For example, embodiments of the present disclosure include a computer program product comprising a computer program carried on a computer readable medium. The computer program comprises a program code for executing the method as shown in the flowchart. In such an embodiment, the computer program may be downloaded and installed from the network through the communication device 709, installed from the storage device 708, or installed from the ROM 702. When the computer program is executed by the processing device 701, the described functions defined in the method according to the embodiment of the present disclosure are executed.

It is noted that the computer-readable medium described above in the present disclosure may be a computer-readable signal medium or a computer-readable storage medium or any combination thereof. The computer-readable storage medium may, for example, be—but is not limited to—a system, device, or apparatus or device that is electrical, magnetic, optical, electromagnetic, infrared, or semiconducting, or any combination of the above. More specific examples of computer-readable storage media may include, but are not limited to: electrical connections having one or more wires, portable computer disks, hard drives, random access memory (RAM), read-only memory (ROM), erasable programmable read-only memory (EPROM or flash memory), optical fibres, portable compact disk read-only memory (CD-ROM), optical storage device, magnetic storage device, or any suitable combination of the foregoing. In the context of the present disclosure, a computer-readable storage medium may be any tangible medium that contains or stores a program that may be used by or in combination with an instruction execution system, device, or apparatus. And in the context of the present disclosure, a computer-readable signalling medium may comprise a data signal propagated in a baseband or as part of a carrier carrying computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a programme for use by, or in conjunction with, an instruction-executing system, apparatus, or device. The program code contained on the computer-readable medium may be transmitted using any suitable medium, including, but not limited to: wire, fibre optic cable, RF (radio frequency), etc., or any suitable combination of the foregoing.

The computer-readable medium may be included in the electronic device; or it may stand alone and not be assembled into such electronic device.

The above-described computer-readable medium carries one or more programs that, when the above-described one or more programs are executed by the electronic device, cause the electronic device to perform the method shown in the above-described embodiments.

Computer program code for carrying out operations for aspects of the present disclosure may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments of the present disclosure may be implemented through software or hardware. The name of a unit does not constitute a limitation to the unit itself in some cases, for example, the first acquisition unit may also be described as "unit to acquire at least two internet protocol addresses".

The functions described herein above may be performed, at least in part, by one or more hardware logic components. For example, without limitation, exemplary types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In a first aspect, an embodiment of the present disclosure provides a method of scheduling a distributed database, comprising:

detecting load states of respective storage units in any first storage node in a distributed database, and determining a hotspot partition of any first storage unit based on the load states;

generating a replica splitting task for a target replica stored in the hotspot partition, the replica splitting task comprising the target number of subreplicas of the target replica after splitting and migration target addresses of the subreplicas; and executing the replica splitting task by invoking a thread in a thread pool, to split the target replica into the subreplicas based on the target number of the subreplicas and migrate at least one of the subreplicas based on the migration target addresses of the subreplicas.

According to one or more embodiments of the present disclosure, generating the replica splitting task for the target replica stored in the hotspot partition comprises:

determining the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node.

According to one or more embodiments of the present disclosure, the method further comprises:

in response to a detection of the first storage node being offline, determining migration target addresses of one or more replicas in the first storage node based on load states of further storage nodes in the distributed database, and generating a first replica migration task based on the migration target addresses of the one or more replicas; and executing the first replica migration task by invoking a thread in the thread pool, to migrate the one or more replicas based on the migration target addresses of the one or more replicas.

According to one or more embodiments of the present disclosure, the method further comprises:

in response to receiving a temporary fault maintenance message of the first storage node, for any of primary replicas comprised in the first storage node, in accordance with a determination that at least one of secondary replicas corresponding to the primary replica is located in a further storage node in the distributed database, generating a first role switching task for the primary replica and any of secondary replicas; and executing the first role switching task by invoking a thread in the thread pool, to perform role switching on the primary replica and any of the secondary replicas.

According to one or more embodiments of the present disclosure, the method further comprises:

in response to receiving a temporary fault maintenance message of the first storage node, for any of primary replicas comprised in the first storage node, in accordance with a determination that all secondary replicas corresponding to the primary replica are located in the first storage node, determining migration target addresses of the primary replica and a corresponding secondary replica based on load states of further storage nodes in the distributed database, and generating a second replica migration task based on the migration target addresses of the primary replica and the corresponding secondary replica; and executing the second replica migration task by invoking a thread in the thread pool, to migrate the primary replica and the corresponding secondary replica based on the migration target addresses of the primary replica and the corresponding secondary replica.

According to one or more embodiments of the present disclosure, the method further comprises:

detecting a replica state of a primary replica comprised in the first storage node; in accordance with a determination that a replica state of the primary replica is abnormal, generating a second role switching task for any secondary replica corresponding to the primary replica and generating a first deletion task for the primary replica; and executing the second role switching task and the first deletion task by invoking a thread in the thread pool, to perform role switching on the secondary replica and delete the primary replica.

According to one or more embodiments of the present disclosure, the method further comprises:

determining whether any primary replica comprised in the first storage node satisfies a predetermined judgement rule, the judgement rule comprising: whether label information of the primary replica matches label information of the first storage node, or whether a current arrangement strategy of the primary replica matches a predetermined arrangement strategy, or whether a predetermined affinity relationship of the primary replica matches the first storage node;

if the primary replica fails to satisfy the predetermined judgement rule, generating a third role switching task for any secondary replica corresponding to the primary replica that satisfies the predetermined judgement rule, and a second deletion task for the primary replica; and executing the third role switching task and the second deletion task by invoking a thread in the thread pool, to perform role switching on the secondary replica and delete the primary replica.

According to one or more embodiments of the present disclosure, the method further comprises:

detecting a replica state of a secondary replica comprised in the first storage node, generating a replica reconstruction task for the secondary replica if a replica state of any primary replica is abnormal; and executing the replica reconstruction task by invoking a thread in the thread pool, to perform a post-deletion reconstruction on the secondary replica.

According to one or more embodiments of the present disclosure, the method further comprises:

obtaining the total number of any primary replica and corresponding secondary replicas in the distributed database, in accordance with a determination that the total number is less than a predetermined number threshold, generating a replica replenishment task based on load states of respective storage nodes in the distributed database; and executing the replica rearrangement task by invoking a thread in the thread pool, to create a secondary replica corresponding to the primary replica in one or more of the storage nodes.

According to one or more embodiments of the present disclosure, the method further comprises:

receiving a client replica read request sent by an agent device, and determining location information of a replica to be returned based on load states of a primary replica and a secondary replica corresponding to a requested replica; and sending, to the agent device, the location information of the replica to be returned, to cause the agent device to read a replica and return it to a client based on the location information of the replica to be returned.

In a second aspect, in one or more embodiments of the present disclosure, a device of scheduling a distributed database is provided, comprising:

a detecting unit configured to detect load states of respective storage units in any first storage node in a distributed database, and determining a hotspot partition of any first storage unit based on the load states;

a task generating unit configured to generate generating a replica splitting task for a target replica stored in the hotspot partition, the replica splitting task comprising the target number of subreplicas of the target replica after splitting and migration target addresses of the subreplicas; and an executing unit configured to executing the replica splitting task by invoking a thread in a thread pool, to split the target replica into the subreplicas based on the target number of the subreplicas and migrate at least one of the subreplicas based on the migration target addresses of the subreplicas.

According to one or more embodiments of the present disclosure, when generating the replica splitting task for the target replica stored in the hotspot partition, the task generating unit is configured to:

determining the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node.

According to one or more embodiments of the present disclosure, the task generating unit is further configured to, in response to a detection of the first storage node being offline, determine migration target addresses of one or more replicas in the first storage node based on load states of further storage nodes in the distributed database, and generate a first replica migration task based on the migration target addresses of the one or more replicas;

The executing unit is further configured to execute the first replica migration task by invoking a thread in the thread pool, to migrate the one or more replicas based on the migration target addresses of the one or more replicas.

According to one or more embodiments of the present disclosure, the task generating unit is further configured to, in response to receiving a temporary fault maintenance message of the first storage node, for any of primary replicas comprised in the first storage node, in accordance with a determination that at least one of secondary replicas corresponding to the primary replica is located in a further storage node in the distributed database, generate a first role switching task for the primary replica and any of secondary replicas;

The executing unit is further configured to execute the first role switching task by invoking a thread in the thread pool, to perform role switching on the primary replica and any of the secondary replicas.

According to one or more embodiments of the present disclosure, the task generating unit is further configured to, in response to receiving a temporary fault maintenance message of the first storage node, for any of primary replicas comprised in the first storage node, in accordance with a determination that all secondary replicas corresponding to the primary replica are located in the first storage node, determine migration target addresses of the primary replica and a corresponding secondary replica based on load states of further storage nodes in the distributed database, and generate a second replica migration task based on the migration target addresses of the primary replica and the corresponding secondary replica;

The executing unit is further configured to execute the second replica migration task by invoking a thread in the thread pool, to migrate the primary replica and the corresponding secondary replica based on the migration target addresses of the primary replica and the corresponding secondary replica.

According to one or more embodiments of the present disclosure, the detecting unit is further configured to detect a replica state of a primary replica comprised in the first storage node;

the task generating unit is further configured to, in accordance with a determination that a replica state of the primary replica is abnormal, generate a second role switching task for any secondary replica corresponding to the primary replica and generate a first deletion task for the primary replica;

The executing unit is further configured to execute the second role switching task and the first deletion task by invoking a thread in the thread pool, to perform role switching on the secondary replica and delete the primary replica.

According to one or more embodiments of the present disclosure, the detecting unit is further configured to determine whether any primary replica comprised in the first storage node satisfies a predetermined judgement rule, the judgement rule comprising: whether label information of the primary replica matches label information of the first storage node, or whether a current arrangement strategy of the primary replica matches a predetermined arrangement strategy, or whether a predetermined affinity relationship of the primary replica matches the first storage node;

the task generating unit is further configured to, if the primary replica fails to satisfy the predetermined judgement rule, generate a third role switching task for any secondary replica corresponding to the primary replica that satisfies the predetermined judgement rule, and a second deletion task for the primary replica;

the executing unit is further configured to execute the third role switching task and the second deletion task by invoking a thread in the thread pool, to perform role switching on the secondary replica and delete the primary replica.

According to one or more embodiments of the present disclosure, the detecting unit is further configured to detect a replica state of a secondary replica comprised in the first storage node;

the task generating unit is further configured to generating a replica reconstruction task for the secondary replica if a replica state of any primary replica is abnormal;

The executing unit is further configured to execute the replica reconstruction task by invoking a thread in the thread pool, to perform a post-deletion reconstruction on the secondary replica.

According to one or more embodiments of the present disclosure, the task generating unit is further configured to obtain the total number of any primary replica and corresponding secondary replicas in the distributed database, in accordance with a determination that the total number is less than a predetermined number threshold, generate a replica replenishment task based on load states of respective storage nodes in the distributed database;

The executing unit is further configured to execute the replica rearrangement task by invoking a thread in the thread pool, to create a secondary replica corresponding to the primary replica in one or more of the storage nodes.

According to one or more embodiments of the present disclosure, a replica location inquiry unit is configured to receive a client replica read request sent by an agent device, and determining location information of a replica to be returned based on load states of a primary replica and a secondary replica corresponding to a requested replica; and send, to the agent device, the location information of the replica to be returned, to cause the agent device to read a replica and return it to a client based on the location information of the replica to be returned.

In a third aspect, an embodiment of the present disclosure provides an electronic device, comprising: at least one processor and a memory;

the memory storing computer execution instructions; and the at least one processor executing the computer execution instructions stored in the memory, causing the at least one processor to perform the method of the first aspect and various possible designs of the first aspect.

In a fourth aspect, an embodiment of the present disclosure provides a computer readable storage medium, wherein computer execution instructions are stored in the computer readable storage medium, the computer execution instructions, when executed by a processor, implementing the method of the first aspect and various possible designs of the first aspect is implemented.

In a fifth aspect, an embodiment of the present disclosure provides a computer program product, comprising computer execution instructions which, when executed by a processor, implement the method of the first aspect and various possible designs of the first aspect is implemented.

The foregoing description is merely illustrative of the preferred embodiments of the present disclosure and of the technical principles applied thereto, as will be appreciated by those skilled in the art, The disclosure of the present disclosure is not limited to the technical solution formed by the specific combination of the described technical features, At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

The invention claimed is:

1. A method of scheduling a distributed database, comprising:
    detecting load states of respective storage units in a first storage node in a distributed database, and determining a hotspot partition of the first storage unit based on the load states;
    generating a replica splitting task for a target replica stored in the hotspot partition, the replica splitting task comprising a target number of subreplicas of the target replica after splitting and migration target addresses of the subreplicas; and
    executing the replica splitting task by invoking a thread in a thread pool, to split the target replica into the subreplicas based on the target number of the subreplicas and migrate at least one of the subreplicas based on the migration target addresses of the subreplicas,
    wherein generating the replica splitting task for the target replica stored in the hotspot partition comprises:
    determining the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node.

2. The method of claim 1, further comprising:
    in response to a detection of the first storage node being offline, determining migration target addresses of one or more replicas in the first storage node based on load states of further storage nodes in the distributed database, and generating a first replica migration task based on the migration target addresses of the one or more replicas; and
    executing the first replica migration task by invoking a thread in the thread pool, to migrate the one or more replicas based on the migration target addresses of the one or more replicas.

3. The method of claim 1, further comprising:
    in response to receiving a temporary fault maintenance message of the first storage node, for a primary replica comprised in the first storage node,
    in accordance with a determination that at least one of secondary replicas corresponding to the primary replica is located in a further storage node in the distributed database, generating a first role switching task for the primary replica and one of the corresponding secondary replicas; and
    executing the first role switching task by invoking a thread in the thread pool, to perform role switching on the primary replica and the one of the corresponding secondary replicas.

4. The method of claim 1, further comprising:
    in response to receiving a temporary fault maintenance message of the first storage node, for a primary replica comprised in the first storage node,
    in accordance with a determination that all secondary replicas corresponding to the primary replica are located in the first storage node, determining migration target addresses of the primary replica and a corresponding secondary replica based on load states of further storage nodes in the distributed database, and generating a second replica migration task based on the migration target addresses of the primary replica and the corresponding secondary replica; and
    executing the second replica migration task by invoking a thread in the thread pool, to migrate the primary replica and the corresponding secondary replica based on the migration target addresses of the primary replica and the corresponding secondary replica.

5. The method of claim 1, further comprising:
    detecting a replica state of a primary replica comprised in the first storage node;
    in accordance with a determination that a replica state of the primary replica is abnormal, generating a second role switching task for a secondary replica corresponding to the primary replica and generating a first deletion task for the primary replica; and
    executing the second role switching task and the first deletion task by invoking a thread in the thread pool, to perform role switching on the secondary replica and delete the primary replica.

6. The method of claim 1, further comprising:
    determining whether a primary replica comprised in the first storage node satisfies a predetermined judgement rule, the judgement rule comprising: whether label information of the primary replica matches label information of the first storage node, or whether a current arrangement strategy of the primary replica matches a predetermined arrangement strategy, or whether a predetermined affinity relationship of the primary replica matches the first storage node;
    if the primary replica fails to satisfy the predetermined judgement rule, generating a third role switching task for a secondary replica corresponding to the primary replica that satisfies the predetermined judgement rule, and a second deletion task for the primary replica; and executing the third role switching task and the second deletion task by invoking a thread in the thread pool, to perform role switching on the secondary replica and delete the primary replica.

7. The method of claim 1, further comprising:
detecting a replica state of a secondary replica comprised in the first storage node, generating a replica reconstruction task for the secondary replica if a replica state of a primary replica is abnormal; and
executing the replica reconstruction task by invoking a thread in the thread pool, to perform a post-deletion reconstruction on the secondary replica.

8. The method of claim 1, further comprising:
obtaining the total number of a primary replica and corresponding secondary replicas in the distributed database,
in accordance with a determination that the total number is less than a predetermined number threshold, generating a replica replenishment task based on load states of respective storage nodes in the distributed database; and
executing the replica rearrangement task by invoking a thread in the thread pool, to create a secondary replica corresponding to the primary replica in one or more of the storage nodes.

9. The method of claim 1, further comprising:
receiving a client replica read request sent by an agent device, and determining location information of a replica to be returned based on load states of a primary replica and a secondary replica corresponding to a requested replica; and
sending, to the agent device, the location information of the replica to be returned, to cause the agent device to read a replica and return it to a client based on the location information of the replica to be returned.

10. An electronic device, comprising: at least one processor and a memory;
the memory storing computer execution instructions; and
the at least one processor executing the computer execution instructions stored in the memory, causing the at least one processor to perform acts comprising:
detecting load states of respective storage units in a first storage node in a distributed database, and determining a hotspot partition of the first storage unit based on the load states;
generating a replica splitting task for a target replica stored in the hotspot partition, the replica splitting task comprising a target number of subreplicas of the target replica after splitting and migration target addresses of the subreplicas; and
executing the replica splitting task by invoking a thread in a thread pool, to split the target replica into the subreplicas based on the target number of the subreplicas and migrate at least one of the subreplicas based on the migration target addresses of the subreplicas,
wherein generating the replica splitting task for the target replica stored in the hotspot partition comprises:
determining the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node.

11. The device of claim 10, further comprising:
in response to a detection of the first storage node being offline, determining migration target addresses of one or more replicas in the first storage node based on load states of further storage nodes in the distributed database, and generating a first replica migration task based on the migration target addresses of the one or more replicas; and
executing the first replica migration task by invoking a thread in the thread pool, to migrate the one or more replicas based on the migration target addresses of the one or more replicas.

12. The device of claim 10, further comprising:
in response to receiving a temporary fault maintenance message of the first storage node, for a primary replica comprised in the first storage node,
in accordance with a determination that at least one of secondary replicas corresponding to the primary replica is located in a further storage node in the distributed database, generating a first role switching task for the primary replica and one of the corresponding secondary replicas, and
executing the first role switching task by invoking a thread in the thread pool, to perform role switching on the primary replica and the one of the corresponding secondary replicas.

13. The device of claim 10, further comprising:
in response to receiving a temporary fault maintenance message of the first storage node, for a primary replicas comprised in the first storage node,
in accordance with a determination that all secondary replicas corresponding to the primary replica are located in the first storage node, determining migration target addresses of the primary replica and a corresponding secondary replica based on load states of further storage nodes in the distributed database, and generating a second replica migration task based on the migration target addresses of the primary replica and the corresponding secondary replica; and
executing the second replica migration task by invoking a thread in the thread pool, to migrate the primary replica and the corresponding secondary replica based on the migration target addresses of the primary replica and the corresponding secondary replica.

14. The device of claim 10, further comprising:
detecting a replica state of a primary replica comprised in the first storage node;
in accordance with a determination that a replica state of the primary replica is abnormal, generating a second role switching task for a secondary replica corresponding to the primary replica and generating a first deletion task for the primary replica; and
executing the second role switching task and the first deletion task by invoking a thread in the thread pool, to perform role switching on the secondary replica and delete the primary replica.

15. The device of claim 10, further comprising:
determining whether any primary replica comprised in the first storage node satisfies a predetermined judgement rule, the judgement rule comprising: whether label information of the primary replica matches label information of the first storage node, or whether a current arrangement strategy of the primary replica matches a predetermined arrangement strategy, or whether a predetermined affinity relationship of the primary replica matches the first storage node;
if the primary replica fails to satisfy the predetermined judgement rule, generating a third role switching task for a secondary replica corresponding to the primary replica that satisfies the predetermined judgement rule, and a second deletion task for the primary replica; and executing the third role switching task and the second deletion task by invoking a thread in the thread pool, to perform role switching on the secondary replica and delete the primary replica.

16. The device of claim 10, further comprising:

detecting a replica state of a secondary replica comprised in the first storage node, generating a replica reconstruction task for the secondary replica if a replica state of a primary replica is abnormal; and executing the replica reconstruction task by invoking a thread in the thread pool, to perform a post-deletion reconstruction on the secondary replica.

17. The device of claim 10, further comprising:

obtaining the total number of a primary replica and corresponding secondary replicas in the distributed database, in accordance with a determination that the total number is less than a predetermined number threshold, generating a replica replenishment task based on load states of respective storage nodes in the distributed database; and executing the replica rearrangement task by invoking a thread in the thread pool, to create a secondary replica corresponding to the primary replica in one or more of the storage nodes.

18. A non-transitory computer-readable storage medium, wherein computer execution instructions are stored in the computer readable storage medium, the computer execution instructions, when executed by a processor, implementing acts comprising:

detecting load states of respective storage units in a first storage node in a distributed database, and determining a hotspot partition of the first storage unit based on the load states;

generating a replica splitting task for a target replica stored in the hotspot partition, the replica splitting task comprising a target number of subreplicas of the target replica after splitting and migration target addresses of the subreplicas; and executing the replica splitting task by invoking a thread in a thread pool, to split the target replica into the subreplicas based on the target number of the subreplicas and migrate at least one of the subreplicas based on the migration target addresses of the subreplicas, wherein generating the replica splitting task for the target replica stored in the hotspot partition comprises:

determining the target number of the subreplicas and the migration target addresses of the subreplicas based on a non-hotspot partition of the first storage unit and/or a further storage unit in the first storage node, wherein the migration target addresses of the subreplicas comprise one or more non-hotspot partitions of the first storage unit and/or the further storage unit in the first storage node.

\* \* \* \* \*